United States Patent [19]
Bourque

[11] Patent Number: 5,306,022
[45] Date of Patent: Apr. 26, 1994

[54] SHAFT SEAL HAVING CAPACITY FOR SUBSTANTIAL WEAR

[75] Inventor: Robert F. Bourque, San Diego, Calif.

[73] Assignee: General Atomics, San Diego, Calif.

[21] Appl. No.: 766,588

[22] Filed: Sep. 27, 1991

[51] Int. Cl.$^5$ .................. F16J 15/38; F16J 15/54; F16J 15/56

[52] U.S. Cl. .................... 277/192; 277/154; 277/163; 277/165; 277/196; 277/199; 277/DIG. 6

[58] Field of Search .............. 277/192, 199, 154, 196, 277/157, 163, 165, 27, 96.2, DIG. 6

[56] References Cited

U.S. PATENT DOCUMENTS

| | | | |
|---|---|---|---|
| 234,327 | 11/1880 | Osgood et al. | 277/192 |
| 237,477 | 2/1881 | Brown . | |
| 391,991 | 10/1888 | Tripp | 277/199 |
| 588,681 | 8/1897 | Leary | 277/199 |
| 892,978 | 7/1908 | Carter | 277/199 |
| 1,164,090 | 12/1915 | Haxton | 277/157 |
| 3,001,806 | 9/1961 | Macks | 277/27 |
| 3,305,241 | 2/1967 | Hart | 277/27 |
| 4,350,349 | 9/1982 | McTavish | 277/199 |
| 4,917,391 | 4/1990 | Shelinbarger, Jr. et al. | 277/192 X |

FOREIGN PATENT DOCUMENTS

| | | | |
|---|---|---|---|
| 0157892 | 8/1939 | Austria | 277/192 |
| 0821751 | 11/1951 | Fed. Rep. of Germany | 277/157 |
| 0834308 | 3/1952 | Fed. Rep. of Germany | 277/157 |
| 0918467 | 2/1947 | France | 277/136 |

OTHER PUBLICATIONS 1 page-heading: "Toyo Tanso Co., Ltd.", undated, illustrating graphite seals.

*Primary Examiner*—William A. Cuchlinski, Jr.
*Assistant Examiner*—Scott W. Cummings
*Attorney, Agent, or Firm*—Fitch, Even, Tabin & Flannery

[57] ABSTRACT

A shaft seal comprising a plurality of members which collectively engage the shaft exterior in substantially uninterrupted 360° sealing contact in a plane perpendicular to the axis of the shaft while providing relatively high capacity for wear using nonflexible materials such as graphite. The provision of 360° contact in a single plane enables engagement between the shaft seal and the shaft to be limited to a single ring structure, rather than requiring a pair of rings in side-by-side abutting relation. The seal members comprise a plurality of followers and an equal plurality of drivers, with each of the members being movable inwardly as it wears. Each of the followers is driven inwardly by drivers on each side as it wears. Each follower has a wear surface configured for sealing engagement with the shaft, and a pair of bearing surfaces for engagement with drivers on either side. Each of the drivers has a pair of bearing surfaces for engaging the respective bearing surfaces of the followers on either side, and a central wear surface for engaging the shaft. The bearing surfaces of the drivers and the followers are substantially planar, and the bearing surfaces on each driver are preferably coplanar with one another. In some embodiments of the invention the followers and drivers are each four in number. In other embodiments the drivers and followers are each three in number. The drivers and followers may be made of a graphite ceramic material and used without lubrication, or alternatively may be made of a babbitt material or other conventional material for use in a lubricated environment.

15 Claims, 5 Drawing Sheets

SHAFT SEAL HAVING CAPACITY FOR SUBSTANTIAL WEAR

BACKGROUND OF THE INVENTION

1. Field of the Invention

The invention relates generally to seals and more particularly to a seal for engaging a moving shaft.

2. Background Information

Many conventional seals and packings have relatively little capacity for wear. A particular problem which arises in certain environments e.g., in jet engine turbines or cryogenic vacuum pumps, is that extremes of temperature and/or pressure may render conventional lubricants impractical as a means of reducing the coefficient of friction between seal members and the shaft exterior. In such environments, flexible seals such as elastomers are unsuitable and therefore the provision of a seal having adequate wear capacity can pose a difficult problem.

Numerous prior patents address the problem of providing seals or packings capable of maintaining sealing contact as they wear. However, the wear capacity of the devices proposed by these patents is typically limited to a relatively small fraction of the shaft diameter, or require flexible components.

U.S. Pat. No. 391,991 describes a six-piece packing in which each piece is provided with a flange and one or more projecting side lips. Each of the side lips is engaged and pressed radially inward by a flange of an adjacent one of the six pieces. Radial gaps between the pieces enable them to move inward as they wear. Inward travel of the pieces is limited by the narrow width of the gaps. Once the pieces shift sufficiently to close the gaps and move into abutting relation with one another, the packing cannot compensate for further wear. Furthermore, the radial dimensions of the six pieces are small with respect to the shaft diameter. Accordingly, the wear capacity of this packing is quite limited.

U.S. Pat. No. 4,350,349 describes another six-piece rod packing which provides a pair of segmented rings. Each ring has radial gaps at its sealing surface. The gaps in the respective rings are offset from one another. As in the above-described U.S. Pat. No. 391,991, the wear life of the packing is limited by the widths of the gaps. It is also noteworthy that this configuration fails to provide 360° sealing contact in any one plane.

Numerous other attempts have been made in the past to provide various improved features for packings. For example, U.S. Pat. No. 588,681 describes a steam packing for a piston rod which is intended to automatically adjust itself to unevenness in the wear of the piston rod or of the packing itself, and U.S. Pat. No. 3,305,241 describes an effort to provide an improved backing ring.

There remains a need for a shaft seal which has a relatively high capacity for wear and which is suitable for use in extreme environments in which lubrication and seal flexibility may be impractical.

SUMMARY OF THE INVENTION

The invention provides a shaft seal comprising a plurality of members which collectively engage the shaft exterior in substantially uninterrupted 360° sealing contact in a plane perpendicular to the axis of the shaft while providing relatively high capacity for wear. The provision of 360° contact in a single plane enables engagement between the shaft seal and the shaft to be limited to a single ring structure, rather than requiring a pair of rings in side-by-side abutting relation.

The seal members comprise a plurality of followers and an equal plurality of drivers, with each of the members being movable inwardly as it wears while the members collectively maintain the substantially uninterrupted 360° sealing contact with the shaft.

Each follower is driven inward as it wears by drivers on each side. Each of the followers has a wear surface configured for sealing engagement with the shaft, and a pair of bearing surfaces for engagement by drivers on either side. Each of the drivers has a pair of bearing surfaces for engaging the respective bearing surfaces of the followers on either side, and a central wear surface for engaging the shaft. The bearing surfaces of the drivers and the followers are substantially planar, and the bearing surfaces on each driver are preferably coplanar with one another.

In some embodiments of the invention, the followers and drivers are each four in number. In other embodiments, the drivers and followers are each three in number. The three drivers are evenly spaced at 120° intervals about the circumference of the shaft, as are the three followers. The bearing surfaces of each follower define an included angle therebetween of 60°. In this configuration, the decrease in radial dimension of each follower due to wear may be as large as one-third of the shaft diameter.

Each of the drivers and each of the followers is preferably made of a graphite ceramic material i.e., a graphite material made by firing at high temperatures. Means may be provided for constraining the followers against circumferential displacement. Also, means may be provided to balance pressure on the seal components to avoid undesirably high inwardly-acting forces due to a high pressure differential across the seal.

Further aspects and features of the invention are explained below and show in the accompanying drawings.

DETAILED DESCRIPTION OF PREFERRED EMBODIMENT

The invention is preferably embodied in a shaft seal comprising a plurality of members which collectively engage the shaft exterior in substantially uninterrupted 360° sealing contact in a plane perpendicular to the axis of the shaft.

Figure 1:
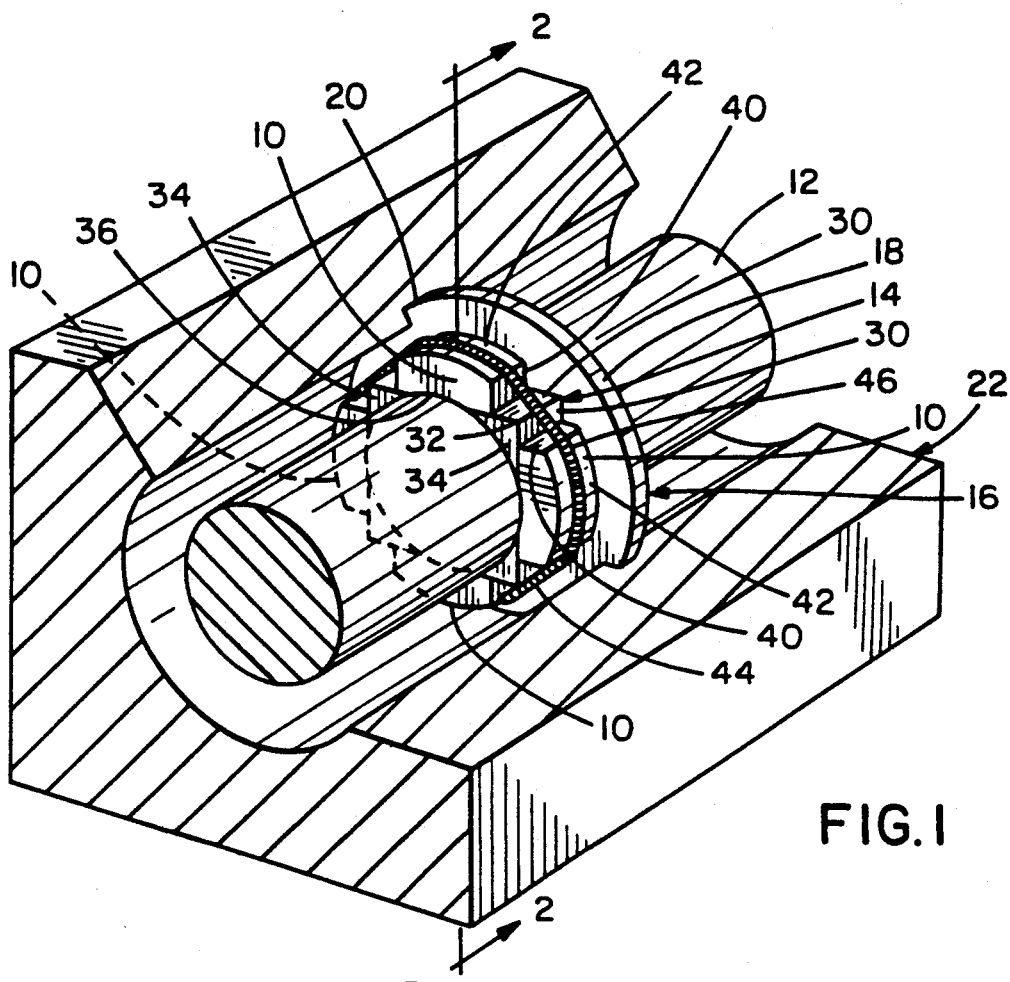
FIG. 1 is a perspective view of a shaft seal in accordance with the invention, disposed in a housing, with part of the housing broken away.
Figure 2:
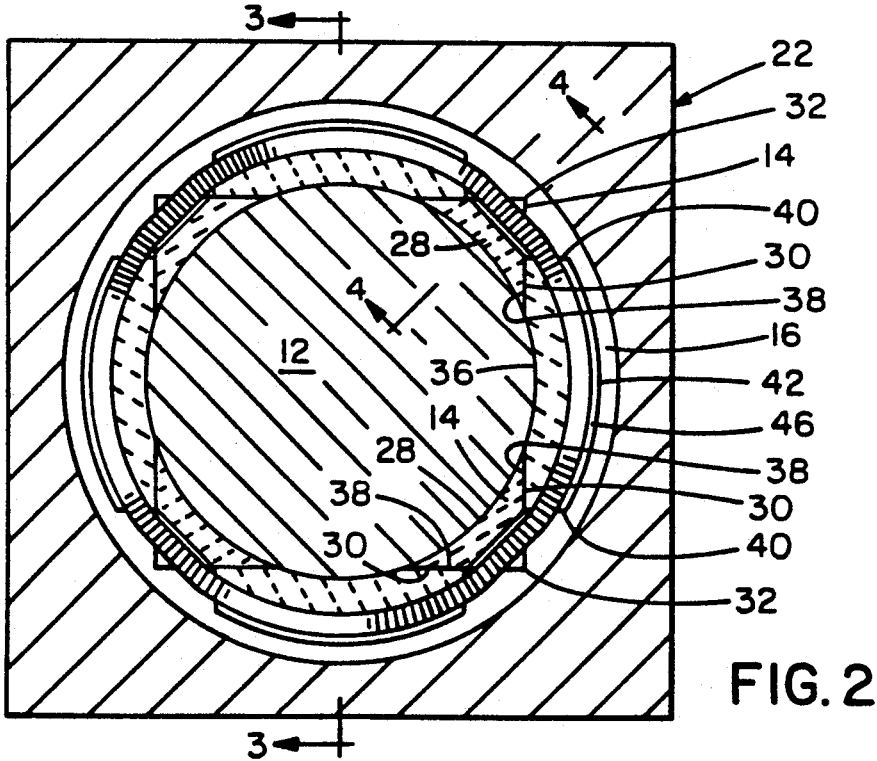
FIG. 2 is a sectional view taken substantially along line 2—2 in FIG. 1.
Figures 3, 5:
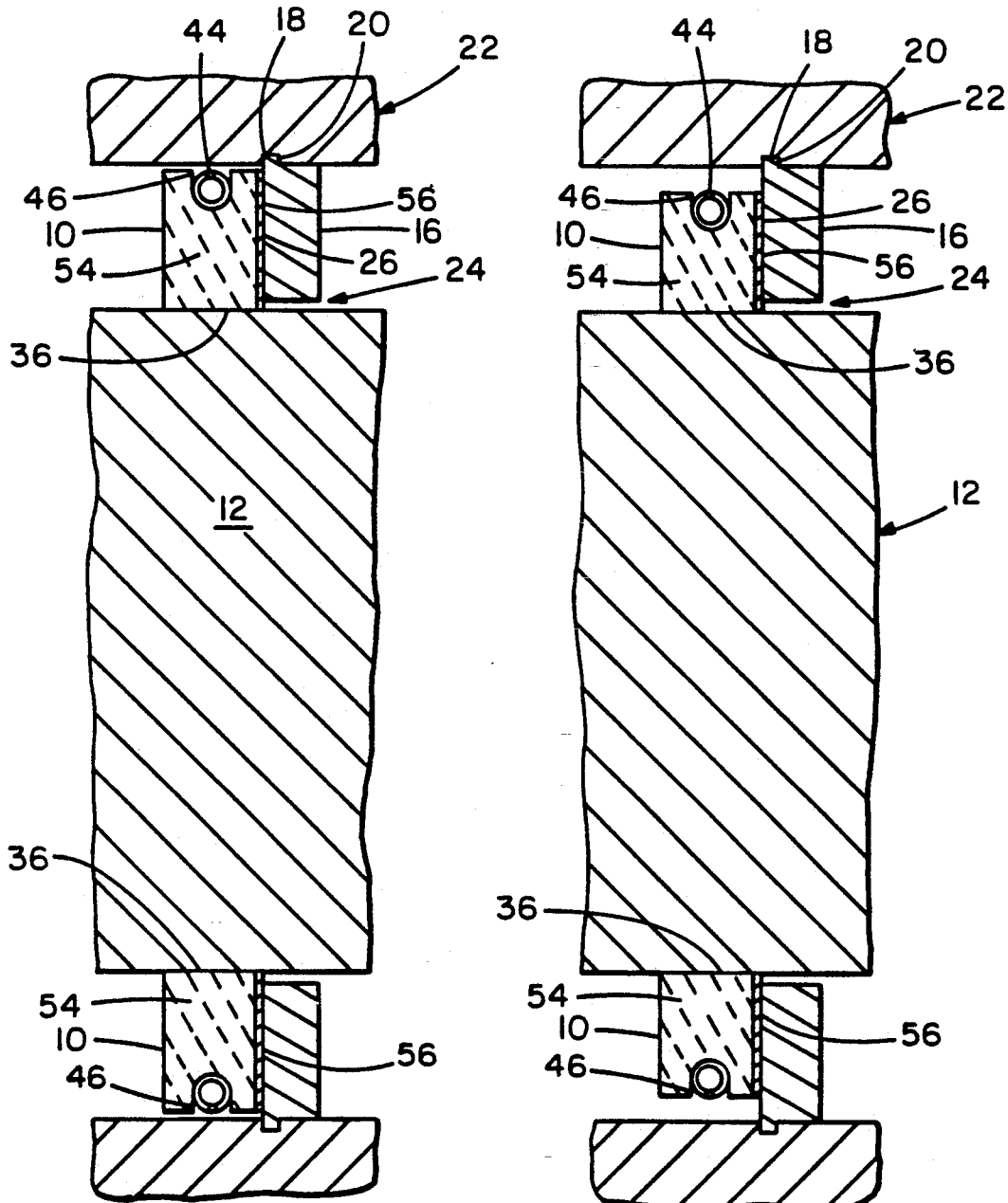
FIG. 3 is a sectional view taken substantially along line 3—3 in FIG. 2.
FIG. 5 is a sectional view similar to that of FIG. 3, but showing the seal in a worn configuration.
Figure 4:
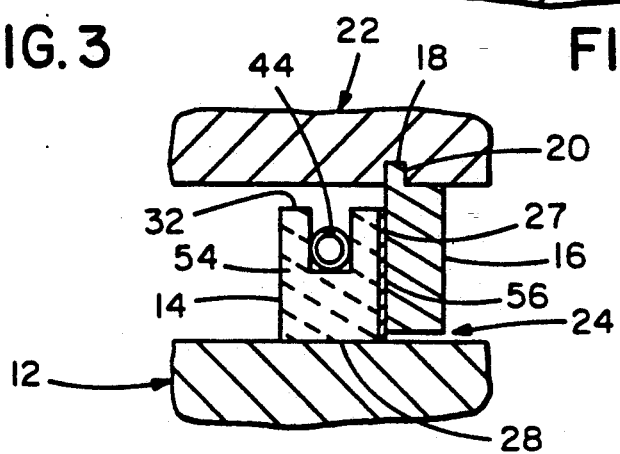
FIG. 4 is a sectional view taken substantially along line 4—4 in FIG. 2.
Figure 6:
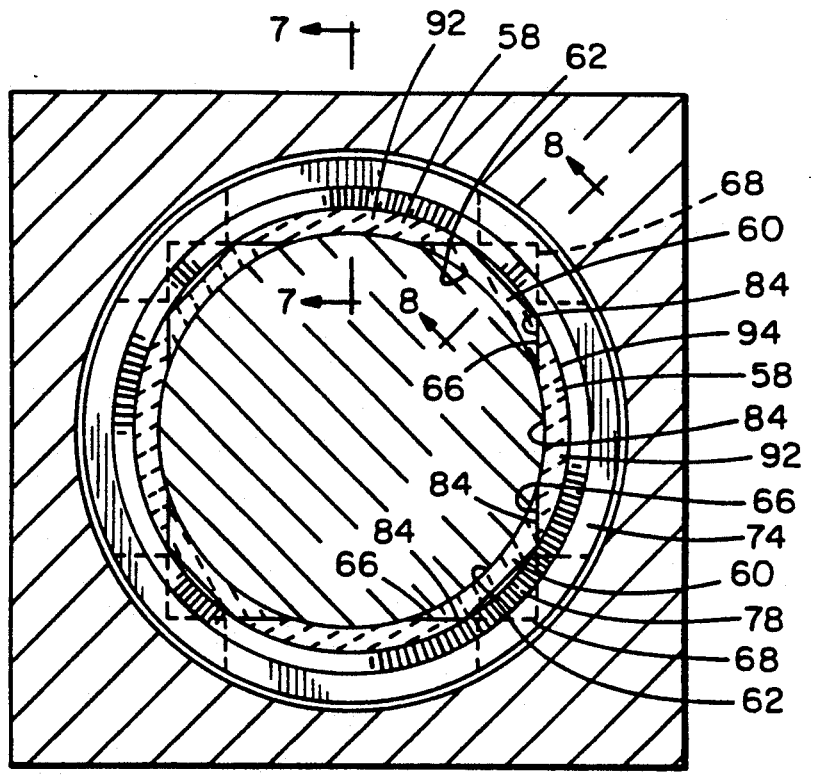
FIG. 6 is an axial sectional view of a shaft seal in accordance with a second embodiment of the invention, with the shaft and housing shown in transverse section taken through the axis of the spring.

In a first embodiment of the invention, illustrated in FIG. 1, the members comprise four drivers 10 spaced at equal circumferential intervals about the periphery of a shaft 12 having a circular-cylindrical surface for engagement by the seal, and four followers 14 which are urged inward by the drivers 10 and which are similarly disposed at equal circumferential intervals about the periphery of the shaft. Each of the members 10 and 14 is symmetrical about a radial plane and is disposed centrally relative to the members on either side. Each of the members 10 and 14 is movable inwardly to accommodate wear while the members collectively maintain substantially uninterrupted 360° sealing contact with the shaft 12.

The seal components abut an annular backing member 16 which constrains the seal components against axial displacement. The backing member 16 has its outer edge 18 received in an internal annular groove 20 in a housing 22 which surrounds the shaft. The seal components 10 and 14 are located on the high-pressure side of the backing member 16, and maintained in abutting relation therewith by fluid pressure. The backing member 16 has a central circular opening 24 having a diameter slightly larger than the shaft diameter. Substantially planar back surfaces 26 and 27 of the drivers 10 and followers 14 respectively engage the backing member 16 in sealing contact and slide therealong as they wear and travel inward.

The shaft 12 as illustrated has a substantially circular cross-section. The shaft may rotate about its axis, or may reciprocate longitudinally. It will be understood that the term "shaft" is used herein in a broad sense, to encompass reciprocating rods, pistons, and the like, in addition to turbine shafts, crankshafts, and other elongated, rotating machine parts.

Each of the followers 14 has a concave wear surface 28 configured as a portion of a circular cylindrical surface, and a pair of substantially planar bearing surfaces 30 for engagement by its associated drivers. The bearing surfaces 30 intersect the opposite ends of the concave wear surface 28, and in the illustrated embodiment, intersect one another at the radially outermost point 32 of the follower. Each follower has a substantially planar front surface 34 on its high-pressure side, opposite the substantially planar back surface 27 which engages the backing member 16.

Each of the drivers 10 has a concave wear surface 36 which complements the surface of the shaft 12, flanked by bearing surfaces 38 on each side for engaging its associated followers. Each of the illustrated drivers 10 has parallel, substantially planar sides 40 extending perpendicularly outward from the bearing surfaces, and an arcuate outer surface 42.

Means are preferably provided to exert inward pressure on the drivers to maintain the seal components in their assembled configuration, and to provide sealing pressure against the shaft. The pressure is preferably provided by a garter spring 44 or the like, interfitting with the outer surface of each driver in a groove 46. The followers also preferably have grooves 48 to accommodate the spring, with their grooves 48 being of sufficient depth to avoid any exertion of inward pressure by the spring 44. As an alternative to the illustrated garter spring, in some embodiments fluid pressure may be employed, without a spring or other external mechanical device, to provide the sealing pressure.

As the seal wears, the wear surface 28 of each of the followers is shortened, while the wear surface 36 on each of the drivers is correspondingly lengthened. The wearing process also shortens the bearing surfaces 30 and 38 of both the drivers and the followers. Because the bearing surfaces of these members intersect their respective wear surfaces, the continuous wearing occurs without interruption of the substantially 360° sealing contact between the members and the shaft exterior.

One problem which may be encountered in any seal in high-pressure environments is that the fluid pressure on the high-pressure side of the seal components which tends to drive the seal components radially inward may increase friction and wear to an unacceptable degree. In the embodiment of FIGS. 1-5, this problem is addressed by forming each of the drivers 10 and followers 14 of a relatively thick mass of permeable graphite material 54 having a thin layer of impermeable graphite 56 on its back surface. The permeable graphite 54 does not support a pressure gradient, and accordingly the pressure differential between the inner and outer surfaces of the seal component only exists at the thin layer of impermeable graphite, resulting in only negligible radially inward force. The backing member in this embodiment has a clearance relative to the shaft on the order of the thickness of the layer of impermeable graphite 56 to limit the possibility of delamination of the impermeable layer from the permeable graphite portion 54 of the component. The seal might be employed alone, or in series with other seals in relatively high pressure applications. A typical application might employ two of the seals in series.

It will be appreciated that permeable and impermeable metal materials might be employed as alternatives to the above-described permeable and impermeable graphite materials.

Figure 15:
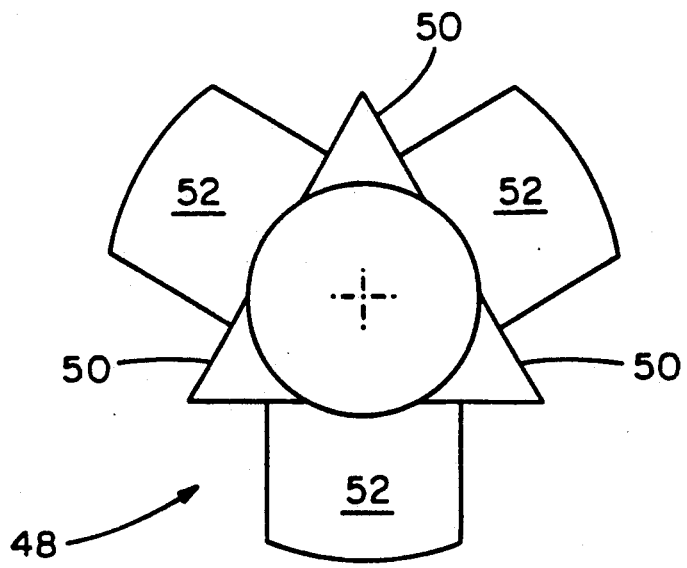
FIG. 15 is a diagrammatic end view of a seal in accordance with a further embodiment of the invention, with the seal shown in initial configuration.
Figure 16:
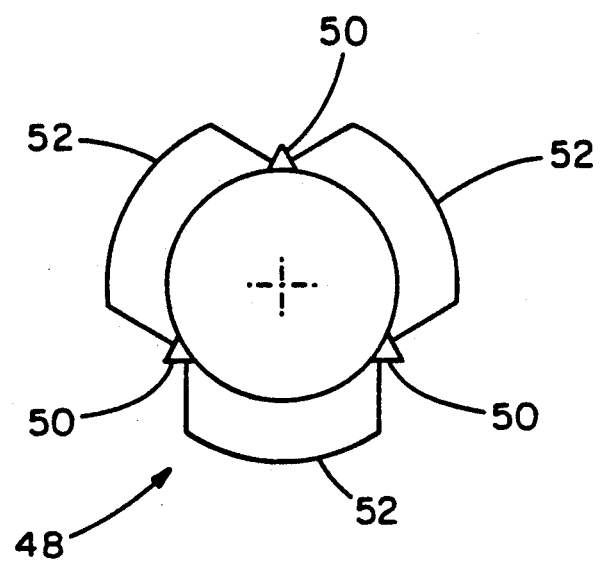
FIG. 16 is a further diagrammatic end view of the seal of FIG. 15, shown in a worn configuration.

FIGS. 15 and 16 illustrate diagrammatically an embodiment substantially similar to that of FIG. 1 except that in the embodiment of FIGS. 15 and 16, the seal comprises three of each of the followers and drivers, rather than four. The embodiment of FIGS. 15 and 16 provides somewhat greater capacity for wear. In the embodiment of FIGS. 15 and 16, the seal can accommodate wear of the seal members of up to about 30% of the shaft diameter.

Figures 7, 8:
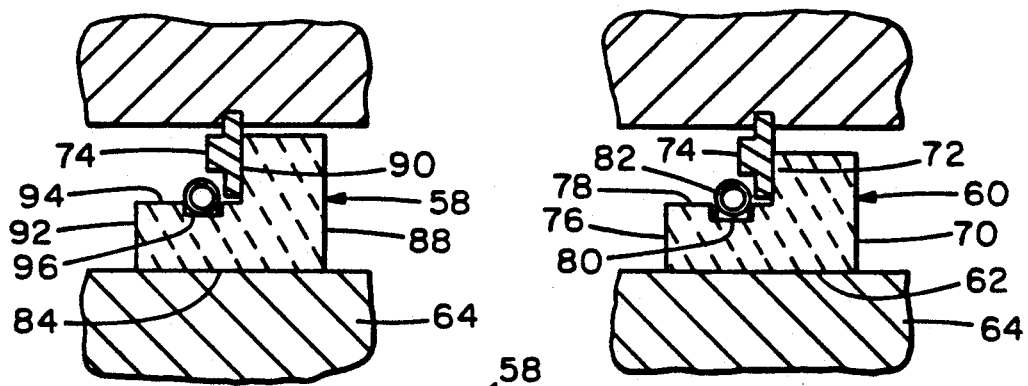
FIG. 7 is a fragmentary sectional view of the seal of FIG. 6, taken substantially along line 7—7 in FIG. 6.
FIG. 8 is a fragmentary sectional view of the seal of FIG. 6, taken substantially along line 8—8 in FIG. 6.
Figure 9:
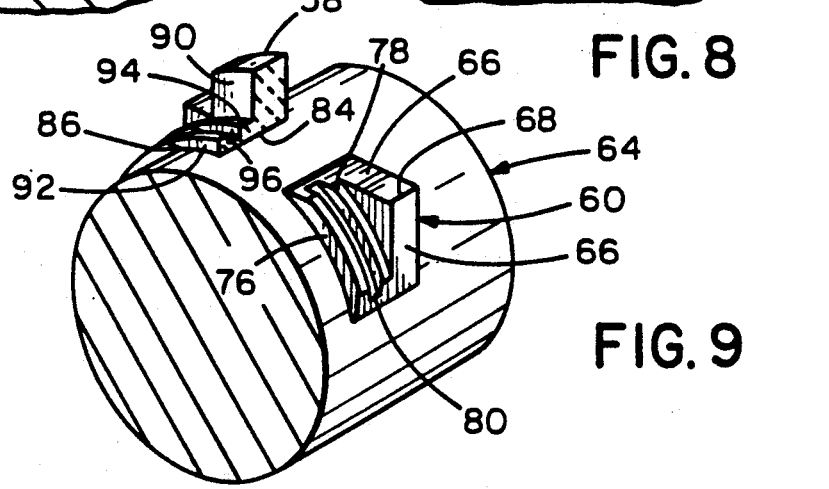
FIG. 9 is a perspective view illustrating components of the seal of FIG. 6 in worn configurations.

FIGS. 6-9 illustrate an embodiment of the invention generally similar to that of FIGS. 1-5 except that the drivers 58 and followers 60 are configured to provide an approximate pressure balance for each component To this end, each of the drivers and followers is configured so that, when viewed in section as in FIGS. 7 and 8, the axial dimension of the component along its inner surface engaging the shaft will be approximately twice that of the outer surface from the backing member to the end face of the seal on the high-pressure side. This provides an approximate fluid pressure balance for each component, assuming an approximately linear longitudinal pressure gradient along the inner surfaces.

Each of the followers 60 has a concave wear surface 62 which is complementary to the surface of the shaft 64 which it engages, and a pair of substantially planar bearing surfaces 66 for engagement by its associated drivers 58. The bearing surfaces 66 intersect one another along a line 68 which defines the maximum radial dimension of the follower. The follower has a substantially planar front surface 70 at the high-pressure side. Opposite the front surface are a first, radially outer back surface 72 engaging the backing member 74, and a second, radially inner back surface 76 at its axial end facing the low pressure side. Between the first back surface and the second back surface is an arcuate clearance surface 78 having an outer diameter slightly smaller than the inner diameter of the backing member 74, and having a groove 80 formed therein of sufficient depth that clearance is provided between the garter spring 82 and the bottom of the groove so that the garter spring does not exert radially inward force on the follower 60.

Each of the drivers 58 has a concave wear surface 84 complementary to the shaft surface, and a pair of substantially planar bearing surfaces 86 for engaging the bearing surfaces 66 of the followers. The bearing surfaces 86 on each driver 58 are coplanar with one another. The driver 58 is similar to the follower in that it has a substantially planar front surface 88 at the high-pressure side, a first back surface 90 engaging the backing member 74, and a second back surface 92 at its low-pressure end. The driver 58 also has an arcuate clearance surface 94 having an outer diameter slightly smaller than the inner diameter of the backing member 74, and having a groove 96 therein to accommodate the garter spring. The bottom of the groove 96 is engaged by the garter spring 82.

Each of the drivers 58 and followers 60 is preferably made of a graphite material having a high-temperature treatment to limit oxidation. Alternatively, the drivers and followers may be made of a conventional lubricated seal material such as a babbitt material.

Figure 14:
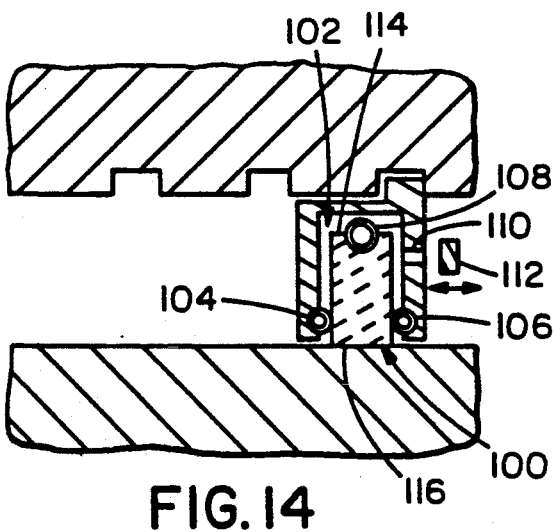
FIG. 14 is another sectional view similar to that of FIG. 11, illustrating a further alternative embodiment.

FIG. 14 illustrates a further embodiment of the invention having means for balancing pressure on seal components. FIG. 14 shows in section a driver 100 which may be part of a seal having components configured generally in accordance with the embodiment of FIGS. 1-5, except that the backing member 98 has an inwardly-facing annular channel 102 formed therein for receiving the seal components, with the seal components being made of an impermeable graphite material. The high-pressure side of the seal is at the left of FIG. 14. A first O-ring 104 is provided on the high-pressure side of the seal component, and a second O-ring 106 is provided on the low-pressure side. In high temperature applications, the O-rings may be made of metal. In other applications, rubber O-rings may be suitable.

A garter spring 108 applies radially inward force to the drivers 100. A vent 110 and means 112 for selectively closing the vent are provided in the low-pressure side of the backing member to permit fluid communication between the interior of the channel 102 and the atmosphere. This permits variation of fluid pressure acting on the radially outward surfaces 114 of the seal components and thereby enables selective control over the pressure balance on the seal components. Thus, for example, where leakage along the seal is sufficiently low that the fluid pressure on the wear surfaces 116 of the seal components 100 is negligible, the vent may be kept open. Alternatively, where leakage is high enough to provide a substantial radially outward force, an opposing reaction force may be maintained by fully or partially closing the vent. It will be appreciated that the vent hole may be kept open during an initial period of seal life, so as to provide for relatively low fluid pressure on the outward surfaces of the seal components, and later closed to increase such forces, in response to a decrease in the force exerted by the garter spring 108 due to relaxation as the shaft wears and/or other factors.

Where the seal of the invention is employed in combination with a rotating shaft, the friction between the shaft and the followers may tend to urge the followers to rotate with the shaft in the direction of the shaft rotation, slightly displacing the followers circumferentially relative to the drivers and potentially creating a wedge effect. Such displacement would, of course, undesirably alter the seal geometry and increase wear and drag. Accordingly, the configuration of the seal components, the tension of the garter spring, and the coefficient of friction between the seal components and the shaft, preferably are selected to avoid such circumferential displacement.

Referring to the embodiment of FIG. 1, and focusing on what would be the leading edge of one of the followers 14 in the event of clockwise rotation of the follower with the shaft 12, the tangential force on the follower due to friction with the shaft may be approximated as $F_f \approx \mu F \cos \theta$ where $\theta$ is the angle between the bearing surface 30 and the wear surface 28 at the leading edge of the follower, $\mu$ is the coefficient of friction, and F is the normal force exerted on the bearing surface 30 of the follower by the driver. The frictional force $F_f$ is opposed by the tangential component of the force applied by the driver to the bearing surface, which may be described as $F_t = F \sin \theta$. Thus, based upon the above approximation, the frictional force will exceed the tangential reaction force where $\mu > \tan \theta$.

In the embodiment of FIG. 1, employing graphite seal components in combination with a steel shaft, the coefficient of friction, $\mu$, may be estimated at 0.1, and $\tan \theta = \tan(22.5°) \approx 0.41$. Thus, the frictional force due to shaft rotation should not exceed the tangential opposing force.

The tangential frictional forces on the followers may increase the pressure between the wear surface of the follower and the shaft to some extent. The normal force on the wear surface of the follower may be approximated as follows:

$$N \approx \frac{W}{1 - \frac{\mu}{\tan\theta}}$$

where W represents the inward radial force on the follower due to factors other than the forces reacting to frictional circumferential loading on the follower, with the other variables defined as above. With $\mu$ and $\theta$ evaluated as above, $N = 1.32W$, indicating that the wedge effect would increase normal force by about 32%. This analysis is strictly applicable only at the leading edge of the follower, and the increase in normal force would be less at a point removed from the leading edge.

Based on the foregoing analyses, it is believed that a wedge effect may cause a finite increase in normal force in seals in accordance with the above-described embodiments of the invention, but will not seriously impair the performance or wear characteristics of the seal. However, in applications involving high coefficients of friction, or smaller angles at the leading edges of the followers, the importance of the wedge effect may be magnified, and means may be required to constrain the followers against circumferential displacement.

Figure 10:
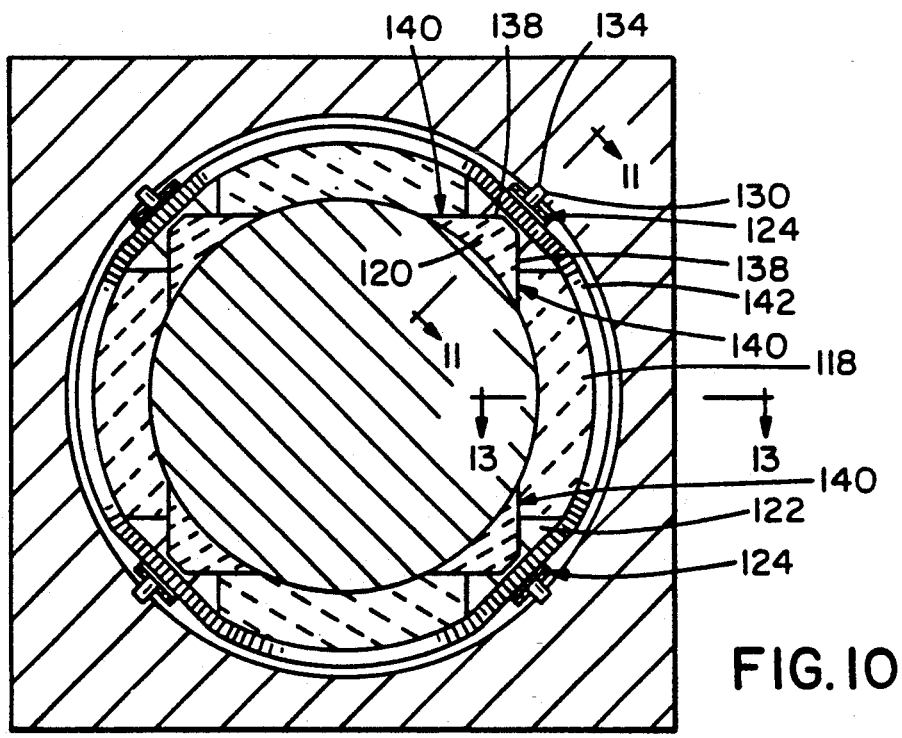
FIG. 10 is an end view of a shaft seal in accordance with a third embodiment of the invention.
Figure 11:
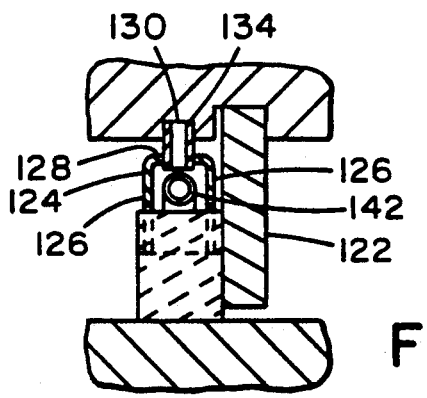
FIG. 11 is a fragmentary sectional view of the seal of FIG. 10, taken substantially along line 11—11 in FIG. 10.
Figure 12:
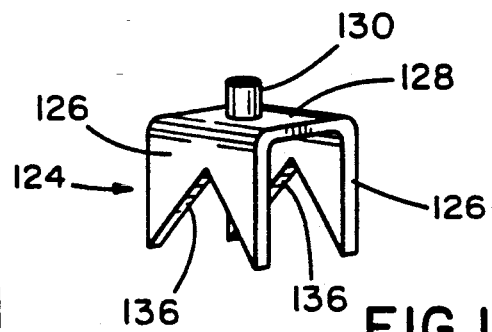
FIG. 12 is a perspective view of a retainer employed in the seal of FIG. 10.
Figure 13:
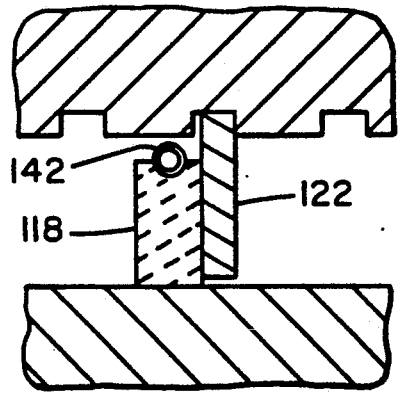
FIG. 13 is a sectional view taken substantially along line 13—13 in FIG. 11.

FIGS. 10 and 11 illustrate an embodiment of the invention which includes means for constraining the followers against circumferential displacement. The seal of FIG. 10 includes drivers 118, followers 120, and an annular backing member 122 substantially similar to those in the embodiment of FIGS. 1-5, and additionally employs a clip 124 engaging one or more followers 120 to prevent circumferential displacement thereof. Each clip 124 is generally U-shaped in cross-section as illustrated in FIG. 11, comprising a pair of parallel sidewalls 126 joined by an integral web 128 having an outwardly extending stud 130 thereon which is received in a bore 134 in the housing. Each of the sidewalls 126 has a V-shaped notch 136 therein conforming to the radially outward portions 138 of the bearing surfaces 140 of a respective follower. As the follower 120 wears, the clip may travel radially inward with the follower, and to this end suitable means may be provided to maintain the clip 124 in contact with the follower.

As shown in FIG. 11, the garter spring 142 passes between the sidewalls 126 of the clip, and as in the previous embodiments, the follower 120 is dimensioned to avoid contact between the garter spring and the follower.

In selecting garter spring tension for a seal in accordance with the invention, it is believed that the short-term efficacy of the seal obviously may be increased with increased spring tension, whereas increased spring tension has disadvantages in the form of increased friction and a consequent increase in heat, and increased rate of wear. For purposes of example, in the case of a 3.5 in. diameter shaft running at 3600 rpm, with a coefficient of friction of 0.1, a garter spring tension of 1 lb. would appear to provide a reasonable compromise of the aforementioned considerations. The radial force per unit of circumference in this example would be 0.57 lbs./in. and the total circumferential frictional drag force would be 0.63 lb.

The drag torque may then be calculated as follows:

$$\tau = 0.63(3.5/2) = 1.1 \text{ in. pounds} = 0.091 \text{ ft-lb}$$

The drag horsepower under these circumstances would be 0.063 hp, or 160 Btu per hour, and the heat flux to be removed would be 1200 Btu/Hr. ft.sq., which should be within acceptable limits.

The above calculations assume a pressure balance on the seal components, and do not take into account the wedge effect discussed above.

From the foregoing it will be appreciated that the invention provides a novel and improved shaft seal. The invention is not limited to the embodiments described above or to any particular embodiments, but rather is pointed out in the claims which follow.

What is claimed is:

1. A shaft seal having capacity for substantial wear comprising a plurality of members which collectively engage a shaft exterior in substantially uninterrupted 360° sealing contact in a plane perpendicular to the axis of the shaft, each of said members being movable inwardly as it wears while said members collectively maintain said substantially uninterrupted 360° sealing contact;

said plurality of members comprising a plurality of followers and an equal plurality of drivers;

each of said followers having a wear surface configured for sealing engagement with said shaft, and a pair of bearing surfaces for engagement by said drivers, said bearing surfaces defining an included angle therebetween of about 90° or less;

each of said followers being driven inward as it wears by drivers on each side;

each of said drivers having a pair of bearing surfaces for engaging respective bearing surfaces of said followers, and a central wear surface between said bearing surfaces for engaging said shaft;

said bearing surfaces of said drivers and said followers being configured such that the intersection of each of said bearing surfaces with a plane perpendicular to the shaft axis defines a line segment.

2. A shaft seal in accordance with claim 1 wherein for each driver, the line segments defined by the intersection of the bearing surfaces of the respective driver with a plane perpendicular to the axis of the shaft are collinear.

3. A shaft seal in accordance with claim 1 wherein the bearing surfaces of each follower define an included angle therebetween of about 60°.

4. A shaft seal in accordance with claim 1 wherein the bearing surfaces of each follower define an included angle therebetween of about 90°.

5. A shaft seal in accordance with claim 1 further comprising a spring loaded in tension engaging said drivers to urge said drivers inward, wherein said followers are urged inward by said drivers and not directly engaged by said spring.

6. A shaft seal in accordance with claim 1 wherein each of said drivers and each of said followers is made of a graphite ceramic material.

7. A shaft seal in accordance with claim 1 further comprising means for constraining said followers against circumferential displacement.

8. A shaft seal in accordance with claim 1 further comprising a backing ring for engaging said members in sealing engagement and constraining said members against axial displacement.

9. A shaft seal in accordance with claim 8 wherein each of said members has a first transverse surface for facing an area of high pressure, a second transverse surface opposite said first transverse surface for facing an area of low pressure, and a third transverse surface disposed between said first and second transverse surfaces for engaging said backing ring.

10. A shaft seal in accordance with claim 9 wherein said third transverse surface of each of said members lies in a plane which approximately bisects the wear surface of the respective member.

11. A shaft seal in accordance with claim 8 wherein each of said members is formed of a permeable material having a transverse back surface with a thin layer of impermeable material thereon engaging said backing ring.

12. A shaft seal in accordance with claim 1 further comprising a fixed outer ring for constraining said members against axial displacement, said outer ring having an inwardly facing annular groove formed therein for receiving said members;

said seal further comprising a pair of annular seals for sealing engagement with opposite sides of said members.

13. A shaft seal in accordance with claim 12 further comprising a valve for enabling pressure to be regulated within said inwardly facing annular groove to control fluid pressure on said members.

14. A shaft seal and shaft, said shaft seal comprising a plurality of members which collectively engage the shaft exterior in substantially uninterrupted 360° sealing contact in a plane perpendicular to the axis of the shaft, each of said members being movable inwardly as it wears while said members collectively maintain said substantially uninterrupted 360° sealing contact;

said plurality of members comprising a plurality of followers and an equal plurality of drivers;

each of said followers having a wear surface configured for sealing engagement with said shaft, and a pair of bearing surfaces for engagement by said drivers;

each of said drivers having a pair of bearing surfaces for engaging respective bearing surfaces of said each of said drivers having a pair of bearing surfaces for engaging respective bearing surfaces of said followers, and a central wear surface between said bearing surfaces for engaging said shaft;

said bearing surfaces of said drivers and said followers being configured such that the intersection of each of said bearing surfaces with a plane perpendicular to the shaft axis defines a line segment;

wherein $\tan\theta > \mu$, $\mu$ being the coefficient of friction between said followers and said shaft and $\theta$ being the angle at which the bearing surfaces of each of said followers intersect the wear surface of the respective follower.

15. A shaft seal in accordance with claim 1 wherein each of said drivers and followers is made of a lubricated babbitt material.

* * * * *

UNITED STATES PATENT AND TRADEMARK OFFICE
CERTIFICATE OF CORRECTION

PATENT NO. : 5,306,022
DATED : April 26, 1994
INVENTOR(S) : Robert F. Bourque

It is certified that error appears in the above-indentified patent and that said Letters Patent is hereby corrected as shown below:

Column 10, lines 3 and 4, delete "each of said drivers having a pair of bearing surfaces for engaging respective bearing surfaces of said".

Signed and Sealed this

Twenty-third Day of August, 1994

Attest:

BRUCE LEHMAN

Attesting Officer      Commissioner of Patents and Trademarks